United States Patent Office 3,389,919
Patented June 25, 1968

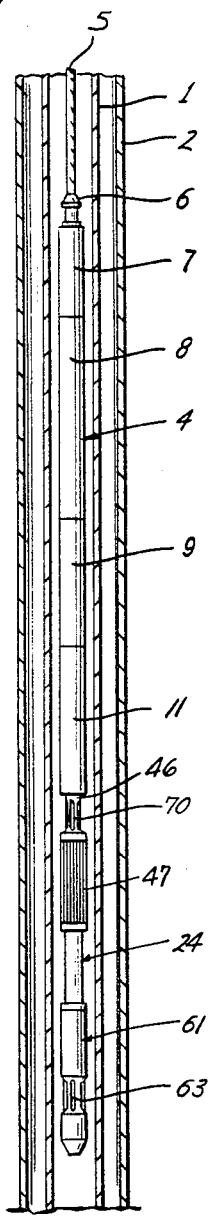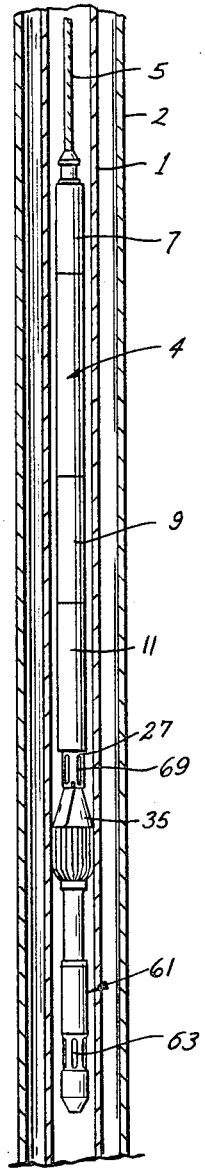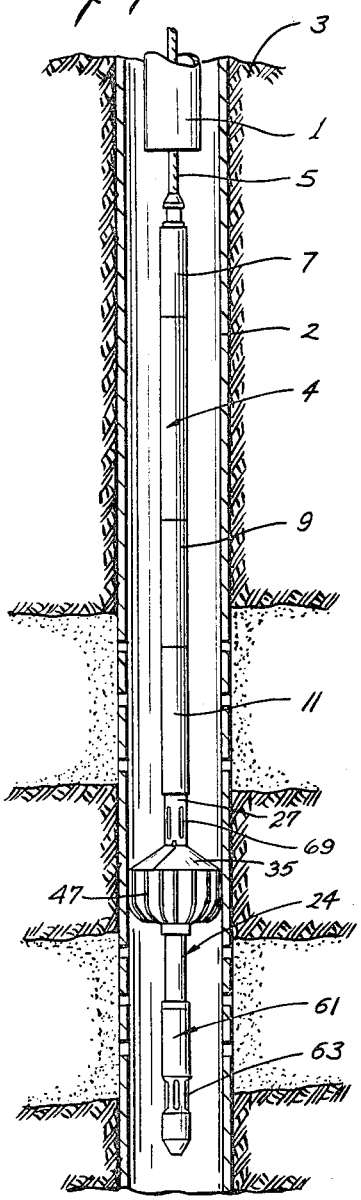

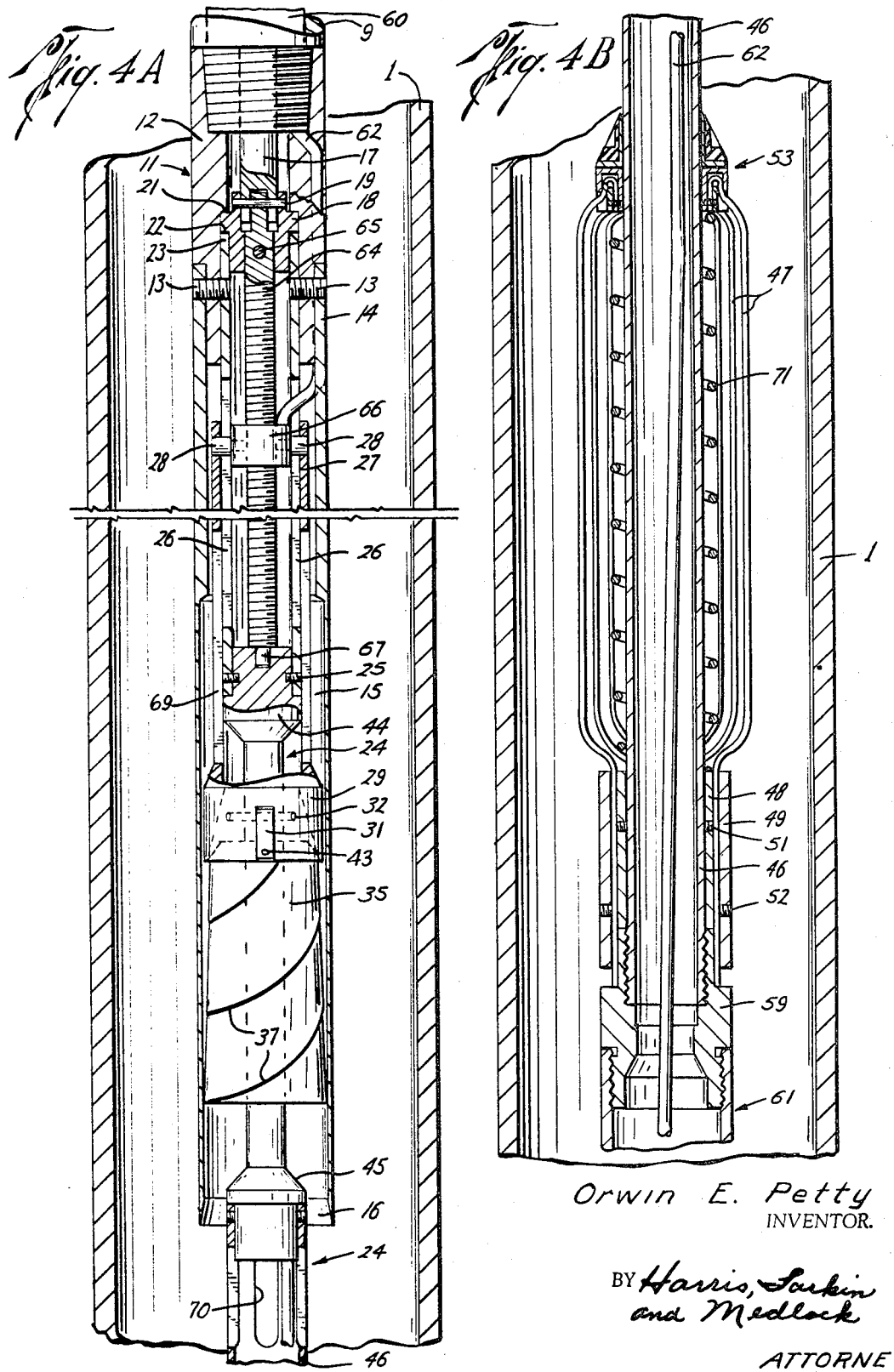

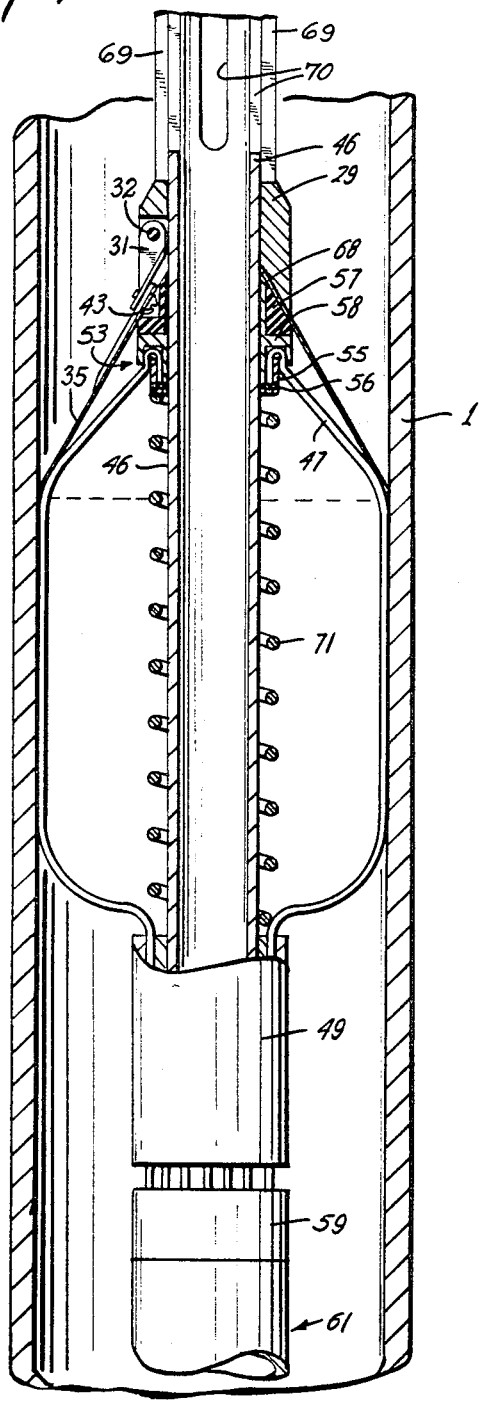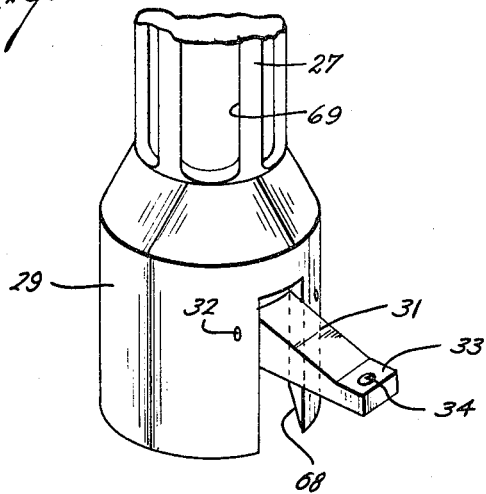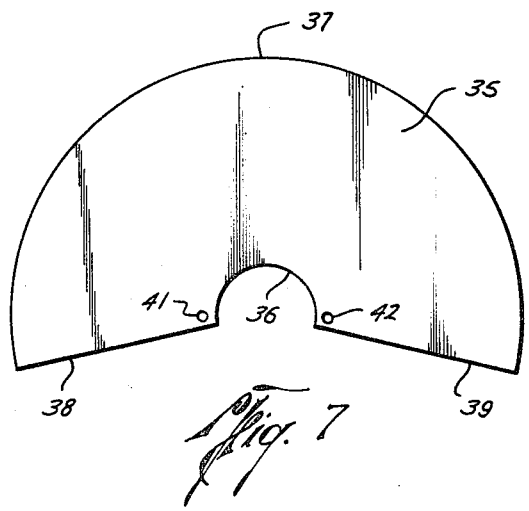

3,389,919
FLOW DIRECTOR MEANS
Orwin E. Petty, Houston, Tex., assignor to Flow Surveys, Inc., Houston, Tex., a corporation of Texas
Filed Feb. 3, 1965, Ser. No. 430,151
9 Claims. (Cl. 277—126)

ABSTRACT OF THE DISCLOSURE

A fluid flow director apparatus for insertion in a fluid conduit or well bore for directing the flow of fluid, as through a flowmeter. It includes a resilient member which is adapted for radially outward and inward expansion and contraction to and from engagement with the wall of the conduit. The resilient member is spiraled upon itself, and in expanding, it is partially unspiraled and on contraction is respiraled.

---

The invention relates to apparatus used for directing fluid flow and more particularly, to apparatus used for directing fluid flow in a passageway which is generally circular in cross-section.

Many devices have been disclosed for directing fluid flow in a passageway to permit measurement of flow conditions, such as direction of flow and rate of flow.

Typical of the devices previously disclosed are those illustrated by the following United States Letters Patent: Dale, No. 2,649,710, issued Aug. 25, 1953; Buck, No. 2,934,947, issued May 3, 1960; White et al., No. 3,036,460, issued May 29, 1962.

Devices such as those illustrated by the above United States Letters Patent usually employ either an elastomeric packer or an articulate metal element for directing fluid flow. Many elastomeric packers have been found to be unsatisfactory when operating in a high temperature and pressure environment. The articulate metal elements are unsatisfactory because they cannot be expanded to fully engage the inner periphery of a passageway through which the fluid may be flowing.

It is an object of the present invention to provide an apparatus for directing fluid flow in a passageway which is capable of operating in a high temperature and pressure environment.

Yet another object is to provide an apparatus for directing fluid flow which can be operated in passageways which vary in diameter from point to point.

Still another object is to provide an apparatus for directing fluid flow which can be operated at several points along a passageway without requiring withdrawal from the passageway after each operation.

Generally, the invention may be defined as an apparatus for placement in a passageway which is generally circular in cross-section, the apparatus including: an elongate housing for suspension in the passageway, a flexible sheet member generally visor shaped in planar condition which is adapted to be overlappingly contracted within the housing when withdrawn into the housing and expanded upon projection from the housing for forming a truncated cone which engages the passageway, and means for withdrawing the sheet member into the housing and projecting the sheet member from the housing.

To be more specific, reference is now made to the drawings which illustrate one embodiment of the invention. In the drawings:

FIG. 1 is a side elevation view of the apparatus of this invention, showing it being supported in a tubing in a casing in a well bore, in the nonoperating condition.

FIG. 2 is a view similar to FIG. 1, but showing the apparatus in the operating condition with the flow director means expanded into contact with the internal surface of the tubing.

FIG. 3 is a view similar to FIG. 2, but showing the device lowered further in the well bore and below the lower end of the tubing, with the device expanded outwardly into operating engagement with the well casing.

FIG. 4A is the top half and FIG. 4B is the bottom half of a figure, which together represent a side elevation view substantially in central vertical section and showing in enlarged detail the various elements of the apparatus as it would appear in FIG. 1.

FIG. 5 is a fragmentary view somewhat similar to FIGS. 4A and 4B, but showing the apparatus actuated to the deflecting position with bow springs engaging the inside surface of the casing.

FIG. 6 is a fragmentary and enlarged isometric view of the lower end of the extension means to which the deflector means is attached.

FIG. 7 is a laid out plan view of the deflector means in the form of a sheet member which is connected to tongue 31 by screw 43 as shown in FIGS. 5 and 6.

Referring now to the drawings, an apparatus for directing fluid flow may be disposed in a passageway defined by a tubular member such as tubing 1 which is generally circular in cross-section. Tubing 1 may be coaxially suspended within a casing 2 of the type normally used in lining well bore holes such as bore hole 3.

The illustrated apparatus for directing fluid flow conveniently takes the form of an elongated housing 4 suspended in tubing 1 by means of cable 5, which through socket 6 is secured to cable socket sub 7. Below socket sub 7 and threadably engaged therewith is a magnetic collar locator 8 of conventional design for aiding the positioning of housing 4 within tubing 1. Carried below collar locator 8 and threadably engaged therewith is a motor case 9 which in turn threadably supports storage segment 11 of housing 4.

Referring now in particular to FIG. 4A, the storage segment 11 of housing 4 is connected to motor case 9 (having electric motor 60 supported therein) through a threaded head 12 which is secured by set screws 13 to annular body 14 which defines at its lower end a recess 15 which is defined in part by tapered surface 16. Depending from motor case 9 and connected to motor 60 is a drive shaft 17 which is secured at its lower end to cap 18 by pin 19 for rotation therewith. Cap 18 is freely journaled between shoulder 21 of head 12 and the top surface 22 of annular liner 23. Liner 23 is secured to head 12 and body 14 by set screws 13 and proximate its lower end is secured to a depending shaft 24 by set screws 25. Liner 23 intermediate its ends is provided with guide slots 26 which run parallel to the coincident longitudinal axes of head 12, body 14 and thus housing 4.

Slidably and coaxially carried within body 14 is an annular extensible member 27 which surrounds liner 23 and the upper end of shaft 24. Extensible member 27 is guided in its slidably movement by pins 28 which pass therethrough and are disposed in guide slots 26 which serve to direct extensible member 27 through bi-directional linear movement, i.e., as viewed in FIG. 4A, up and down movement parallel to the longitudinal axis of liner 23. Extensible member 27 has a lower enlarged end 29, particularly illustrated in FIG. 6, to which a tongue 31 is pivotally mounted by pin 32. Tongue 31 is adapted to be pivotally moved through a vertical arc which describes a plane encompassing the longitudinal axis of extensible member 27. Tongue 31 at its non-pivotally mounted end 33 is provided with an aperture 34 for carrying a screw 43 (FIGS. 4A and 5) which loosely mounts a flexible sheet member 35 to the internal side of tongue 31. Sheet member 35 in planar condition (laid out plan view) as illustrated in FIG. 7, is shaped generally like a visor. Sheet 35 has an inner periphery 36 and an outer periphery 37 which describe concentric arcs, both of which between proximate edges 38 and 39 subtend a common angle which is greater than 180°. Sheet member 35 is provided proximate its inner periphery 36 with two apertures 41 and 42 which are aligned in a registering relationship by overlapping of proximate edges 38 and 39 when sheet member 35 is secured to tongue 31 by screw 43 as illustrated in FIG. 5. Screw 43, to permit pivotal movement of overlapping edges 38 and 39 thereabout, loosely secures sheet member 35 to tongue 31. Sheet member 35, as particularly illustrated in FIG. 4A, is adapted to radially contract when withdrawn into recess 15 and to spiral in superposing relationship upon itself. Sheet member 35 is preferably carried within recess 15 during movement of the apparatus within a passageway to prevent damage to sheet member 35. To permit the inner periphery 36 of sheet member 35 to contract within end 29 of extensible member 27 when sheet member 35 is radially contracted within a recess 15, shaft 24 is of reduced diameter intermediate its upper end 44 and shoulder 45.

Shaft 24 below shoulder 45 includes an annular extension 46 having approximately the same external diameter as end 44. Around extension 46 are a plurality of bow springs 47 longitudinally aligned with extension 46 and arranged thereabout in a cylindrical fashion as illustrated in FIG. 4B. The lowermost end of springs 47 are secured between inner collar 48 and outer collar 49. Inner collar 48 is secured to extension 46 by set screw 51 and outer collar 49 is secured about springs 47 by set screws 52. The upper ends of bow springs 47 are secured to body 58 (FIG. 5) of collar 53 by an annular retaining band 55 which is held fixed relative to body 58 by set screw 56 which pass through body 58 and urge band 55 radially outward. The housing oriented end (upper end) of collar 53 is frusto-conical shaped and is provided with an elastomeric liner 57 which may be secured about body 58 of collar 53 by any suitable means. Liner 57 is preferably a Teflon material, but may conveniently be formed of rubber, nylon or the like. Collar 53 is slidably carried about extension 46 and adapted for bi-directional linear movement therealong, i.e., as viewed in FIG. 5, up and down along the longitudinal axis of extension 46.

The lower end of extension 46 through an adapter 59 (FIG. 5) threadably carries a metering capsule 61 which may contain conventional fluid flow metering apparatus such as that illustrated in United States Letters Patent 3,036,460, issued to White et al. Any electrical impulses which may be generated in the metering apparatus carried by meter capsule 61 may be transmitted to a recording means through electrical conduit 62 (FIGS. 4A and 4B) which communicates through housing 4 with electrical conductors in cable 5.

Metering capsule 61 is provided with openings 63 (FIGS 1, 2, and 3) through which a fluid may communicate with metering apparatus contained in capsule 61. To assure that a fluid flowing in the passageway in which the apparatus may be located will enter or be discharged through openings 63 means are provided for directing the entire fluid flow through openings 63. Such means in the embodiment of the invention illustrated conveniently take the form of the sheet member 35 which, as illustrated in FIG. 4A, is retracted within recess 15 defined by body 14. Means are provided for projecting the sheet member 35 from recess 15 to form a truncated cone which engages the pasageway as illustrated in FIG. 2. The means for projecting sheet member 35 take the form of a threaded rod 64 (FIG. 4A) which is pinned to cap 18 by pin 65. Rod 64 passes through and threadably engages a threaded ring 66 and is freely journaled at its tip 67 in end 44 of shaft 24. Ring 66 receives and is secured to pins 28 which pass through extensible member 27 and ride in guide slots 26 as explained before. As viewed in FIG. 4A, rotation of drive shaft 17 to the left will cause threaded ring 66 to move up along rod 64, rod 64 being provided with right hand threads. Of course rotation of drive shaft 17 in the opposite direction will cause downward movement of ring 66. Drive shaft 17 may be driven by any suitable motor means carried in motor case 9, such as a DC motor 60, the direction of rotation of which can be reversed by reversing polarity of the motor. When drive shaft 17 is rotated in a direction to effect downward movement of threaded ring 66, extensible member 27 will move downward relative to body 14, projecting sheet member 35 from the lower end of recess 15. Sheet member 35, which is preferably a metal material, will radially expand to form a truncated cone such as illustrated in FIG. 2 due to the spring action (resiliency) of the metal and due to movement of inner periphery 36 of sheet member 35 over shoulder 45 to shaft 24.

To assure that sheet member 35 is completely expanded and firmly engaged about its outer periphery 37 with a passageway such as tubing 1, the downward movement of extensible member 27 and sheet member 35 is continued until collar 53 is contacted by sheet member 35 and thereby moved down extension 46 to the point where bow springs 47 are compressed radially outward as illustrated in FIGS. 2, 3 and 5, at which time the upper portion of sheet member 35 will be firmly pressed between surface 68 (FIGS. 5 and 6) of end 29 and elastomeric liner 57 (FIG. 5). An operator of the apparatus can detect full projection or contraction of sheet member 35 by observing a current meter (not shown) interposed in the electrical lines (not shown) which supply current to the motor means in the form of motor 60 contained in motor case 9. The flow of current to the motor means will increase when load on the motor means increases due to engagement of sheet member 35 with tubing 1 or casing 2 or withdrawal of sheet member 35 into recess 15. Alternatively, limit switches of conventional design (not shown) may be so positioned along guide slots 26 that current to the motor means will be cut off when sheet member 35 is fully projected or contracted.

As illustrated in FIG. 2, when sheet member 35 is engaged with tubing 1, fluid passing upwardly through tubing 1 will be directed through openings 63 and fluid passing downwardly through tubing 1 will be directed through openings 69. Fluid passing upwardly through tubing 1 will enter openings 63, pass through the metering apparatus in meter capsule 61, up through extension 46 and out openings 70 in extension 46 and thence out openings 69. In the event that fluid flow is downward through tubing 1, the flow path will be reversed from that of fluid flowing upward through tubing 1. Thus, in the event of either upward or downward flow, the fluid will be directed through the metering apparatus 61.

If after measuring fluid flow conditions at one point in tubing 1, it is desired to determine fluid flow conditions at a second point, movement of the apparatus may readily be effected. Sheet member 35 may be radially contracted and withdrawn into recess 15 by rotation of drive shaft 17 by motor 60. Body 14 is preferably provided with the tapered surface 16 to minimize damage to sheet member 35 upon its withdrawal into recess 15. Sheet member 35 may also be coated with a lubricant such as graphite or the like to facilitate its contraction.

Upon withdrawal of sheet member 35 into recess 15, housing 4 can be positioned at another point within tubing 1 by manipulation of cable 5. Sheet member 35 can then be projected to engage tubing 1 and flow determinations again made in the manner described above.

The apparatus may also be employed to direct fluid flow in passageways of varying or different diameters. As illustrated in FIG. 2, the apparatus is being used to direct fluid flow in a tubing 1. If the tubing terminates at some point intermediate the ends of bore hole 3 and it is desired to determine fluid flow characteristics in a casing 2 which extends below tubing 1, the apparatus may be suspended in the casing 2 and sheet member 35 expanded as illustrated in FIG. 3.

To enhance the efficiency of bow springs 47, when the apparatus is used in passageways of different diameters, collars 49 of differing lengths may be disposed about the bottom of bow springs 47. For example, if fluid flow determinations are to be made in a passageway having a relatively large diameter a collar 49 of relatively short length may be placed about the bottom of bow springs 47 to assure that a sufficient length of the springs is available for radial movement to fully expand sheet member 35. If the apparatus is to be used in a passageway of relatively small diameter, a collar 49 of great length may be used since little lateral movement of the bow springs will be needed and greater compressive strength will be realized.

To assure that bow springs 47 contract upon withdrawal of sheet member 35 into recess 15, an auxiliary spring such as coil spring 71 may be provided to urge collar 53 upwardly and assure radial contraction of bow springs 47.

Various modifications in the embodiment illustrated and described will be obvious to those skilled in the art, as will alternative embodiments of the invention.

For example, while sheet member 35 is preferably a metal material, it may be nylon, Teflon or the like. Additionally, the magnitude of the angle subtended between proximate edges 38 and 39 of sheet member 35 will be governed to some extent by the magnitude of the radius of the outer periphery 37 of sheet member 35. To illustrate, as the radius of outer periphery 37 increases the subtended angle between proximate edges 38 and 39 can decrease as proximate edges 38 and 39 will more readily overlap to form a truncated cone.

Also, hydraulic means may be employed rather than electric motor means for contracting and projecting the sheet member 35.

While rather specific terms have been used to describe one embodiment of the invention, they are not intended nor should they be construed to limit the scope of the invention as defined in the appended claims.

I claim:
1. An apparatus for diverting fluid flow in a passageway, comprising:
   an elongated housing for suspension in a passageway which is generally circular in cross-section,
   the housing being provided with at least one guide slot which is parallel to the longitudinal axis of the housing;
   an extensible sleeve member, coaxially and slidably carried by the housing and provided with a pin disposed in the guide slot for directing movement of the sleeve member;
   a tongue pivotably carried at one end thereof by the sleeve member for pivotal movement through a vertical arc which defines a plane encompassing the longitudinal axis of the sleeve,
   a relatively thin flexible sheet member which in planar condition is generally visor shaped having proximate edges and an inner and outer periphery which describe concentric arcs both of which subtend a common angle between the proximate edges which is greater than 180°,
   the proximate edges of the sheet member being overlapped and pivotally pinned proximate their inner periphery to the nonpivotally mounted end of the tongue,
   the sheet member being adapted to be spiraled upon itself and thereby radially contracted upon retraction into the housing and unspiraled and thereby radially expanded when projecting from the housing to form a truncated cone which engages the passageway;
   means carried by the housing for effecting bidirectional movement of the sleeve member relative to the housing and thereby projection and retraction of the sheet member from the housing.
2. The apparatus of claim 1 including:
   a shaft depending from, supported by and coaxially aligned with the housing;
   a plurality of bow springs longitudinally aligned with the shaft and arranged thereabout in a cylindrical fashion,
   each of the springs having the end thereof most remote from the housing secured to the shaft,
   a collar member slidably carried about the shaft with the end of each band spring proximate to the housing secured thereto,
   the housing oriented end of the collar being frustoconical shaped and being so positioned on the shaft that upon projection of the sheet member from the housing the collar will pass interiorly of the sheet member and the springs mounted below will urge the sheet member into radial expansion.
3. The apparatus of claim 2 including:
   removable collar means placed about the bow springs proximate their lower end for controlling the amount of the springs available for radial expansion.
4. In an apparatus for placing in a passageway which is generally circular in cross-section, the combination comprising:
   an elongated housing for suspension in the passageway;
   the housing having a recess provided in at least one end thereof;
   a flexible spring metal sheet member generally visor shaped in laid out plan view and adapted to be overlappingly contracted within the recess in the housing by being spiraled upon itself when withdrawn into the recess and to be expanded by unspiraling upon projection from the recess for forming a truncated cone which engages the pasageway; and
   means for withdrawing the sheet member into said recess in the housing and projecting the sheet member from said recess in the housing at predetermined times.
5. The apparatus of claim 4 including:
   spring means for urging the sheet member into radial expansion upon projection of the sheet member from said recess in the housing.
6. An apparatus for controlling fluid flow in a passage which is generally circular in cross-section, said apparatus comprising:
   an elongated housing adapted for suspension in said passageway, said housing having a generally annular recess in one end thereof;
   extension means connected to and mounted inside of housing and adapted for relative axial movement therewith;
   means for effecting relative axial movement in both axial directions between said housing and said extension means at predetermined times;
   a resilient sheet member generally visor shaped in laid out plan view having proximate edges and an inner periphery and an outer periphery, with the proximate edges thereof being overlapped and pivotally pinned near the inner periphery to said extension means, said sheet member being adapted to spiral upon itself and to thereby contract radially inward upon retraction thereof into said annular recess in response to axial movement of said extension means relative to said housing in one axial direction and to unspiral and thereby expand radially outward upon projection from said recess to form a truncated cone with the outer periphery thereof engaging the wall of said passageway upon axial movement of said extension means relative to said housing in the other axial direction.
7. The apparatus as claimed in claim 6 including:
   spring means connected to said housing and adapted to contact the inner surface of said sheet member and to urge said sheet member into radial expansion upon movement of said extension means relative to said housing in said other axial direction.

8. The apparatus as claimed in claim 7 wherein:
said spring means includes a plurality of longitudinally aligned bow springs axially spaced apart from said sheet member;
and including removable collar means mounted about the ends of said bow springs opposite said sheet member, for controlling the radial expansion of said bow springs during said movement of said extension means relative to said housing in said other axial direction.

9. The apparatus as claimed in claim 6 wherein:
said extension means includes a tubular member having a fluid flow passage therethrough for flowing fluid diverted by said sheet member when said sheet member engages the wall of said pasageway.

References Cited
UNITED STATES PATENTS

| | | | |
|---|---|---|---|
| 2,649,710 | 8/1953 | Dale | 166—202 X |
| 2,649,711 | 8/1953 | Dale | 166—202 X |
| 2,767,794 | 10/1956 | Lynes | 277—116.2 X |
| 2,929,455 | 3/1960 | Godbey | 166—202 X |
| 3,156,318 | 11/1964 | Caldwell | 73—155 X |
| 3,195,042 | 7/1965 | Glenn et al. | 73—155 X |

LAVERNE D. GEIGER, *Primary Examiner.*

J. S. MEDNICK, *Assistant Examiner.*